United States Patent [19]
Anderson, Jr.

[11] 3,861,379
[45] Jan. 21, 1975

[54] LOW PROFILE SOLAR RAY CONCENTRATOR

[76] Inventor: Henry Anderson, Jr., 9401 Seminole St., Silver Spring, Md. 20901

[22] Filed: Mar. 5, 1974

[21] Appl. No.: 448,279

[52] U.S. Cl. ................................. 126/271, 353/3
[51] Int. Cl. ............................................ F24j 3/02
[58] Field of Search ............ 126/270, 271; 237/1 A; 250/203; 350/289, 299; 353/3

[56] References Cited
UNITED STATES PATENTS

| | | | |
|---|---|---|---|
| 509,390 | 11/1893 | Paine | 126/270 |
| 1,632,254 | 6/1927 | Vinogradov | 353/3 |
| 1,951,404 | 3/1934 | Goddard | 126/270 |
| 2,712,772 | 7/1955 | Trombe | 126/270 X |
| 2,913,583 | 11/1959 | Regnier et al. | 250/203 R |
| 3,305,686 | 2/1967 | Carter et al. | 250/203 R |

FOREIGN PATENTS OR APPLICATIONS

| | | | |
|---|---|---|---|
| 353,007 | 10/1937 | Italy | 126/270 |
| 1,520,370 | 11/1962 | France | 126/271 |

Primary Examiner—William F. O'Dea
Assistant Examiner—Peter D. Ferguson

[57] ABSTRACT

A solar ray collector having the ability to track the diurnal path of the sun, concentrate its rays upon a single field while maintaining a low structural profile for easy incorporation into present dwelling architecture. Solar concentration is accomplished by focusing a plurality of parallel reflectors, rotatable about parallel longitudinal axes, upon a single field parallel to the reflectors. A photo-electric device attached to the mechanism tracks the sun, accounts for its diurnal variation, and through use of an electro-magnetic device, causes the reflectors to rotate about their axes to maintain the focus of the sun on the single field.

15 Claims, 3 Drawing Figures

Patented Jan. 21, 1975

3,861,379

LOW PROFILE SOLAR RAY CONCENTRATOR

BACKGROUND OF THE INVENTION

This invention relates to a solar energy concentrator, and more particularly to a system for tracking the sun and converting the solar energy for heating purposes.

Solar energy collectors are designed to trap the radiant energy of the sun, which is a form of heat, and raise the temperature of an intermediary fluid, normally water. This hot water can then be used to heat dwellings or for other purposes. For home use, a collector would need approximately 1,000 square feet of collective area.

Collector designs which do not concentrate the sun's rays are most commonly seen in home use. Because no concentration of the sun's rays occurs, the diurnal path of the sun need not be accounted for; i.e., no tracking is necessary, and the collector can remain firmly affixed to the dwelling. Although the resultant temperature rise of the intermediary fluid is low (about 100° F) and large heat storage volumes are required to provide heat during sunless hours, the designs themselves are easily adapted architecturally to existing home construction techniques.

Collectors which concentrate the sun's rays are usually reflectors of the Fresnel or parabolic type. All concentrating reflectors focus the rays of the sun on a single field. This requires that the focal line of the collector always point at the sun; i.e., that sun tracking is required. Since very high temperatures are obtainable with these devices, the heat storage volume, which is inversely proportional to the collector temperature, would be significantly smaller if adapted to home use. Steam production at the collector would also become feasible, leading to further utilization of the radiant energy of the sun.

A major drawback arises when adapting the concentrating collector to home usage. Since this collector must also have 1,000 square feet of collective area, the feat of moving such a large collector while tracking the sum would be economically unfeasible to incorporate in home usage. Thus, the advantages of high collector temperatures have not been feasible until now.

The use of an array of mirrors to focus the rays of the sun upon a single field is disclosed in U.S. Pat. No. 260,657, and 412,724, in which the array of N rows by M columns of reflectors track the sun by moving (by a clock-work mechanism) the entire array about a fixed point upon which the sun's rays are concentrated by using a lens. Columns and rows of fixed reflectors to concentrate the suns rays upon a single point are again disclosed in U.S. Pat. No. 2,846,724 and 2,987,961. It has been determined, however, that these reflectors are not suited for practical use for a home inasmuch as the method of tracking the sun involves moving or rotating the entire reflector array or a heliostat of the same size. For reflectors of approximately 1,000 square feet, this would not be easily or economically achieved. The physical plant required to move the reflector array and/or heliostat during sun tracking would be complicated and expensive in itself and unaesthetic if accomplished. Because of its bulk, this type of reflector array design and attendant mechanisms for sun tracking would not be easily incorporated into existing home architecture or dwellings. If incorporated into home usage, a separate and adjacent plot of land for the reflector array and tracking mechanism would be required. Further, efficient focusing of N by M universally adjustable reflectors would be difficult to achieve, resulting in inefficient heat transfer.

SUMMARY OF THE INVENTION

Accordingly, there is provided a solar concentrator comprising reflecting surfaces coupled together such that all reflecting surfaces rotate about their longitudinal axes through the same angle. The concentrator, comprising an array of reflecting surfaces, mounted on a framework firmly attached to a structure, tracks the sun by rotating only the individual reflecting surfaces through the same angle and maintains the focus of the sun upon a boiler tube. Tracking of the sun is accomplished by employing a photo-electric device coupled to an electromagnetic device which rotates the reflecting surfaces.

OBJECTS OF THE INVENTION

It is therefore an object of the present invention to provide an improved solar ray concentrator.

Another object of the present invention is to provide a solar tracker to provide economical home heating capabilities.

Yet another object of the present invention is to provide a solar ray tracker and concentrator which maintains a low, fixed structure profile to be aesthetically pleasing to incorporate into existing home architecture.

Still another object of the present invention is to provide a solar ray concentrator of relatively low cost and size to produce an economical source of power.

A further object of the present invention is to provide a pre-focused sun tracking device which may track the sun.

BRIEF DESCRIPTION OF THE DRAWINGS

These and other objects, features and attendant advantages of the present invention will become better understood by reference to the following detailed description when considered in connection with the accompanying drawings wherein.

DESCRIPTION OF THE PREFERRED EMBODIMENT

Figure 1:
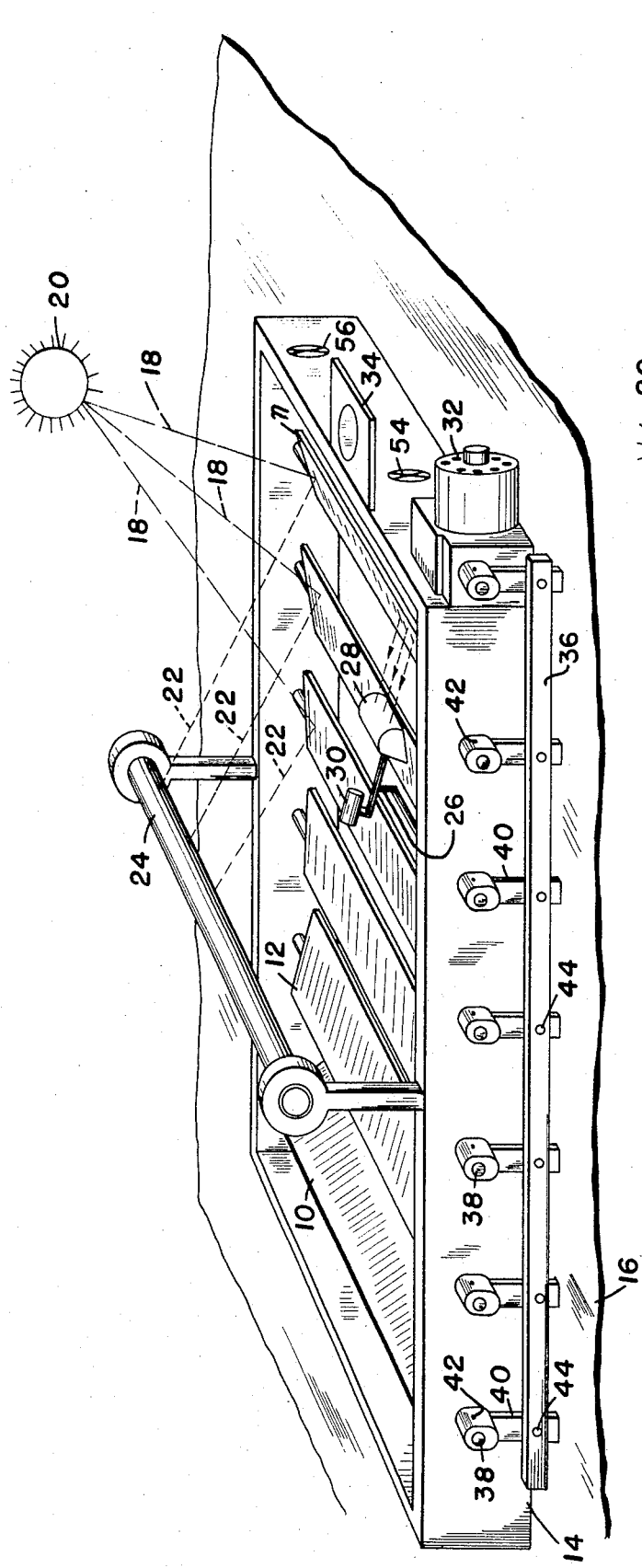
FIG. 1 is an isometric view of the solar ray concentrator according to this invention.

Referring now to the drawings, wherein like referred characters designate identical or corresponding parts throughout the several views, and more particularily to FIG. 1, thereof, wherein reflecting surfaces 10, 12....n are pivotably mounted for rotation about their longitudinal axes on a framework 14. Framework 14 is shown flat, but may comprise a parabolic cross-section. While only six such reflecting surfaces are illustrated, it is to be understood that the drawing is merely illustrative, and that many more surfaces may be utilized to achieve the desired collector area. The reflecting surfaces 10,12....n may comprise a mirror, metallic or non-metallic, transparent or non-transparent to provide a front or back surfaced reflector, or of another type of light reflecting coating. The reflectors 10,12...n are shown as rectangularly shaped, although any other suitable configuration, such as parabolic or circular cross section to achieve solar concentration may be employed. Framework 14 is fixably mounted on structure 16, such as a dwelling roof or the like, and is tilted to insure that the plane of the framework is perpendicular to the declination plane of the sun. Perpendicularity would not be necessary to track sun 20, but it would be an optimum setting for the collector 24, which may comprise a boiler tube, at a specific time of the year because of the perpendicularity of the sun's incident rays upon the reflectors 10,12....n. At other times of the year, the efficiency of the collector would be slightly reduced. In areas distance from the equator, retilting the framework twice a year would improve the overall efficiency of the collector 24.

In operation, each of the reflecting surfaces 10,12....n are pre-focused during assembly to framework 14 onto a boiler tube 24 according to equation (1) to be described hereinafter, wherein incident solar rays 18 from the sun 20 are reflected from the reflecting surfaces 10,12....n as reflected rays 22 to be intercepted by the boiler tube 24 (collector). Boiler tube 24 is shown as a single tube and as long as reflecting surfaces 10,12....n, but can also have a non-circular cross section, or may comprise an arrangement of more than one tube, and further may comprise of a metallic or non-metallic material. Insulation on the non-irradiated area or a secondary reflector to trap rays reflected from the boiler tube 24 can also be included. A medium, such as liquid or vapor flowing through boiler tube 24 is heated by reflected rays 22 and can be utilized for heating purposes or other practical uses.

A sun detector 26 is shown attached to the framework 14 comprising cylindrical lens 28 and a photo-electric device 30 situated in the focal line of the lens. The focal line of detector 26, since it uses a cylindrical lens 28, lies in the reflective plane comprising the centerlines of the boiler tube 24 and an arbitrary reflector n, both of which are parallel to each other, and is adjusted such that when reflector n is properly focused on the boiler tube 24, photo-electric device 30 in the detector 26 is illuminated by the reflected rays 22 from the sun 20. Movement of the sun 20 during the day results in the movement of reflected rays 22 whereby photo-electric device 30 becomes un-illuminated, or shaded. When shaded, it causes an electromagnetic device 32, to which it is electrically connected, to uniformly rotate, through a system of gears and levers, to be described hereinafter, all the reflective surfaces 10,12....n, including reflector n, in such a direction that the photo-electric device 30 is once again illuminated. When this occurs, the rotation of the reflectors 10,12....n, is stopped by electrically stopping the electromagnetic device, and the sun's rays reflected from reflector n are once again properly focused on boiler tube 24. Since all reflecting surfaces 10,12....n are pre-focused on the boiler tube 24 during assembly, when reflector n is focused on boiler tube 24, all reflective surfaces 10,12....n are properly focused on boiler tube 24. In this manner, the sun 20 is tracked in its diurnal path while maintaining proper focus of its rays reflected from reflective surfaces 10,12....n upon the boiler tube 24.

Reflectors 10,12....n are coupled to one another and the electromagnetic device 32 through alignment bar 36. Pivot shaft 38 is firmly attached to reflector 10 and is coupled to collar and lever assembly 40 by a set screw 42 or similar functioning attachment or clamping arrangement. Assembly 40 is also pinned to alignment bar 36 by element 44 to allow free rotation. Similarly, reflectors 12....n are coupled to alignment bar 36, and thereby to each other, in an identical manner. The distance between shafts 38 and the elements 44 pinning assemblies 40 to alignment bar 36, are equal, such that when bar 36 is caused to move by electro-magnetic device 32, to which it is connected, all reflectors 10,12...n rotate through the same angle for reasons to be described hereinafter. The levers and bars can be replaced by gears, chains or sprockets to achieve the same effect.

Figure 3:
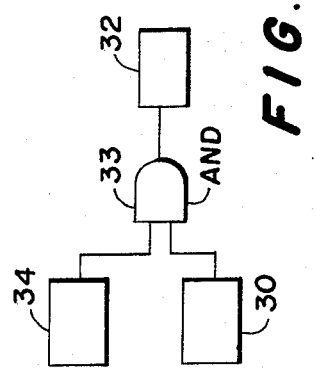
FIG. 3 is a schematic diagram illustrating a system for coupling the two photoelectric devices to the electromagnetic device according to this invention.

The advent of a partly cloudy day could disrupt the tracking of the sun 20. To eliminate this potentiality, a second photo-electric device 34, mounted to framework 14, is employed. If it were shaded, due to a cloudy day, it would interrupt a rotation signal from photo-electric device 30 to electromagnetic device 32, and prevent rotation of the reflectors 10,12...n. Referring to FIG. 3, a simple AND GATE 33 having as its inputs the outputs of photo-electric devices 30 and 34, and having its output coupled electrically to the electromagnetic device 32 could accomplish this operation although any other similar arrangemennt may be employed. When photo-electric device 34 is re-illuminated by the incident rays 18 from the sun 20, photo-electrical device 30 would be allowed to complete its aforementioned task.

The preceding discussion applies to a situation when the sun's position leads that of the position of the sun detector 26, and occurs when the normal tracking of the sun is interrupted by clouds. In the morning, at the beginning of the tracking day, a reverse situation occurs in which the position of the sun could lag that of the position of the sun detector 26. To eliminate premature and erroneous tracking of the sun 20, the physical geometry of photo-electric device 34 is such that it cannot be illuminated by the morning sun 20 before it is possible, by the limit of the angle of rotation of reflecting surface n, for the sun 20 to illuminate the photo-electric device 30 of sun detector 26.

A timer or a limit switch 54, which may be mounted to the framework 14 and activated at the end of the day, causes the motor 32 to return the reflectors 10,12.....n to the morning position.

Figure 2:
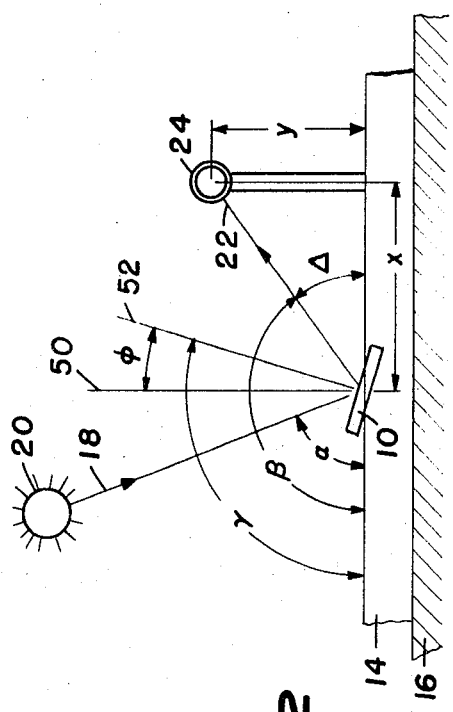
FIG. 2 is a schematic diagram depicting the angles between the various elements of the solar concentrator according to this invention.

Referring now to FIG. 2, there is shown the relationship between the various elements in the solar concentrator according to this invention for pre-focusing reflectors 10,12....n during assembly to framework 14 whereby the rays reflected from the reflectors would strike the boiler tube 24. Derived also is analytical verification of the idea of coupled reflectors which rotate uniformly together to track the sun and their rate of rotation.

Boiler tube 24 is located a distance along the horizontal $x$ and a vertical distance $y$ from the reflector 10. Line 50 is normal to the framework 14 and 52 is normal to the reflector 10.

$\gamma$ is the angle between framework 14 and line 52,
$\beta$ is the angle between framework 14 and the reflected ray 22,
$\alpha$ is the angle between framework 14 and the incident ray 18,
$\Delta$ is the supplement angle of angle $\beta$, $\phi$ is the angle between line 50 and line 52. It is also the angle of rotation between reflector 10 and framework 14.

$\gamma = \beta + \alpha/2$, since the angle of incidence equals the angle of reflectance.

$\phi = \gamma - 90° = \beta + \alpha/2 - 90°$ now $\Delta = 180° - \beta = \text{Tan}^{-1} y/x$ or $\beta = 180° - \text{Tan}^{-1} y/x$ Therefore, $$\phi = \frac{180° - \tan^{-1}\frac{y}{x} + \alpha}{2} - 90°$$

or simplifying, $\phi = \alpha/2 - \text{Tan}^{-1}/2\ y/x$ \hfill (1)

Equation (1) defines the angle between the reflector 10 and the framework 14 required to focus the reflected rays 22 of the sun 20 from said reflector onto the boiler tube 24 for any diurnal position of th sun, described by angle $\alpha$, and for any geometrical position of the reflector 10 from the boiler tube 24. Differentiating equation (1) with respect to time results in the following equation:

$$d\phi/dt = d/dt\ [\alpha/2 - \text{Tan}^{-1}/2\ ^-y/x] = \frac{1}{2}\ d\alpha/dt$$

(2)

since $d/dt\ [\text{Tan}^{-1}/2\ y/x] = 0$, $x$ and $y$ being constants.

Since $d\alpha/dt$ is the diurnal rate of the sun's travel (having a value of 15° per hour) and this proof holds for one arbitrarily positioned reflector, it holds for each and every reflector located in the array.

All reflectors 10,12.....n can be pre-focused on the boiler tube 24 according to equation (1) and setting $\alpha$ equal to 90°. This corresponds to noon time and would position the reflectors 10,12...n at the center of their rotational travel. It can be seen by equation (2) that to maintain focus of the reflected rays 22 upon the boiler tube 24 through the sun's diurnal path, all the reflectors 10,12....n must simply be rotated at a rate equal to exactly one-half the rate and in the same direction as the sun.

Equations (1) and (2) derived from the aforementioned discussion are not necessary to obtain the objectives of this invention. They provide an analytical derivation of data which could have been verified empirically.

Obviously numerous variations and modifications of the above described best mode or preferred embodiment of the invention defined in the appended claims may be made in light of the above teachings. Should it be desired, sun detector 26 may be eliminated and a timing device 56, coupled to electro-magnetic device 32 and calibrated to rotate reflecting surfaces 10,12....n at one-half the rate of rotation of the sun according to the analysis described hereinabove [equation (2)], be substituted in its place to maintain the sun's reflected rays 22 upon boiler tube 24.

Accordingly, it is anticipated that within the scope of the appended claims the invention may be practiced otherwise than specifically described in the foregoing specification.

What is claimed and desired to be secured by Letters Patent of the United States is:

1. A solar ray concentrator comprising:
   a fixably mounted framework;
   a plurality of parallel reflectors pivotably mounted on said framework for rotation about their longitudinal axes;
   collector means for intercepting and collecting reflected solar rays from said reflectors; and
   means coupled to said reflectors for individually and uniformly rotating said reflectors to track the sun whereby said solar rays are reflected toward said collector means, said rotating means comprising:
   a sun detector having a focal line in the reflective plane between said collector means and a first reflector for supplying an output signal upon the lack of detection of a reflected solar ray from said first reflector, said sun detector comprising a cylindrical lens independently mounted to said framework between said first reflector and said collector means, and a first photoelectric device independently mounted to said framework between said lens and said collector means, said first photoelectric device situated in the focal line of said lens, whereby reflected solar rays from said first reflector, if properly directed at said collector means, would cause illumination of said first photoelectric device while reflected solar ray from said first reflector not causing illumination of said first photoelectric device would cause said first photoelectric device to supply said output signal; and
   an electromagnetic device coupled to receive said output signal and supply a signal to said reflectors for rotating said reflectors in the direction of the sun's apparent motion until said sun detector detects reflected solar rays from said first reflector.

2. A solar ray concentrator as recited in claim 1 further including:
   a second photo-electric device coupled to said electromagnetic device for preventing said first photoelectric device from supplying said output signal upon occurrence of a lack of output from said second photo-electric device indicating clouds or nightfall obstructing the solar rays from the sun.

3. A solar ray concentrator as recited in claim 2 wherein said collector means comprises a medium containing boiler tube.

4. A solar ray concentrator as recited in claim 3 wherein said framework is fixably mounted perpendicular to the declination plane of the sun on a structure.

5. A solar ray concentrator as recited in claim 2 wherein said rotating means further includes:
   an alignment bar coupled to said electromagnetic device;
   a plurality of collar and lever assemblies equidistantly pinned to said alignment bar; and
   a plurality of shafts equi-distant from each other and pinned to respective collar and lever assemblies and coupled to respective reflectors: whereby each of said reflectors rotates through the same angle until said first photo-electric device stops supplying said output signal indicating that said reflectors are properly aligned to reflect solar rays at said collector means.

6. A solar ray concentrator as recited in claim 2 further including means to return said reflectors at the end of the day to a morning position.

7. A solar ray concentrator as recited in claim 6 wherein said reflectors comprise mirrors, and said electromagnetic device comprises a motor.

8. A solar ray concentrator as recited in claim 1 wherein each of the said reflectors is mounted to said framework and pre-focused upon said collector means according to equation $$\phi = \alpha/2 - \text{Tan}^{-1} 2\ y/x$$

wherein:
- $\phi$ is the angle between the line normal to said framework and the line normal to said reflector, $\alpha$ is the angle between said framework and an incident ray from the sun onto said reflector,
- $x$ is the distance along the horizontal between said collector means and said reflector and $y$ is the distance along the vertical between said collector means and said reflector.

9. A solar ray concentrator as recited in claim 8 wherein said reflectors are rotated in the same apparent direction as the sun and at one-half the rate of rotation of the sun.

10. A solar ray concentrator as recited in claim 9 wherein said reflectors are rotated at a rate of approximately seven and one-half degrees per hour.

11. A solar ray concentrator comprising
  a fixably mounted framework;
  a plurality of parallel reflectors pivotably mounted on said framework for rotation about their longitudinal axes;
  collector means for intercepting and collecting reflected solar rays from said reflectors;
  a sun detector including a first photoelectric device, said detector having a focal line in the reflective plane between said collector means and a first reflector for supplying an output signal only upon lack of detection of reflected solar rays from said reflector;
  an electromagnetic device coupled to receive said output signal uniformly and individually rotate said reflectors to track the sun until said sun detector detects reflected solar rays from said solar rays whereby rays are reflected toward said collector means; and
  a second photoelectric device coupled to said electromagnetic device for preventing said first photoelectric device from supplying said output signal upon occurrence of a lack of output from said second photoelectric device indicating clouds or nightfall obstructing the solar rays from the sun.

12. A solar ray concentrator as recited in claim 11 further including a cylindrical lens located between said first photoelectric device and said first reflector and in the reflective plane between said collector means and said first reflector, wherein reflected solar rays, if properly directed at said collector means, would cause illumination of said first photoelectric device.

13. A solar ray concentrator as recited in claim 12 wherein each of the said reflectors is mounted to said framework and pre-focused upon said collector means according to equation $$\phi = \alpha/2 - \text{Tan}^{-1} 2\ y/x$$

wherein;
- $\phi$ is the angle between the line normal to said framework and the line normal to said reflector, $\alpha$ is the angle between said framework and an incident ray from the sun onto said reflector, $x$ is the distance along the horizontal between said collector means and said reflector and $y$ is the distance along the vertical between said collectors means and said reflector.

14. A solar ray concentrator as recited in claim 12 further including means to return said reflectors at the end of the day to a morning position and wherein said reflectors comprise mirrors, said collector means comprises a medium containing boiler tube, and said framework is fixably mounted perpendicular to the declination plane of the sun on a structure.

15. A solar ray concentrator as recited in claim 12 wherein said rotating means further includes:
  an alignment bar coupled to said electromagnetic device;
  a plurality of collar and lever assemblies equidistantly pinned to said alignment bar; and
  a plurality of shafts equi-distant from each other and pinned to respective collar and lever assemblies and coupled to respective reflectors; whereby each of said reflectors rotates through the same angle until said first photo-electric device stops supplying said output signal indicating that said reflectors are properly aligned to reflect solar rays at said collector means.

* * * * *